(12) United States Patent
Sejnowski et al.

(10) Patent No.: US 9,033,351 B2
(45) Date of Patent: May 19, 2015

(54) BABY WALKER (71) Applicant: GOODBABY CHILD PRODUCTS CO., LTD., Kunshan, Jiangsu (CN)

(72) Inventors: Joseph Paul Sejnowski, Kunshan (CN); Cai Hui, Kunshan (CN); Zheng Yi, Kunshan (CN)

(73) Assignee: Goodbaby Child Products Co., Ltd., Jiangsu (CN)

( * ) Notice: Subject to any disclaimer, the term of this patent is extended or adjusted under 35 U.S.C. 154(b) by 0 days.

(21) Appl. No.: 14/370,781

(22) PCT Filed: Oct. 20, 2012

(86) PCT No.: PCT/CN2012/083252
§ 371 (c)(1),
(2) Date: Jul. 6, 2014

(87) PCT Pub. No.: WO2013/102366
PCT Pub. Date: Jul. 11, 2013

(65) Prior Publication Data
US 2015/0042058 A1    Feb. 12, 2015

(30) Foreign Application Priority Data

Jan. 6, 2012 (CN) .................... 2012 2 0003584 U (51) Int. Cl.
*B62B 7/12* (2006.01)
*A47D 13/04* (2006.01)
*B62K 9/00* (2006.01)
*B60N 2/30* (2006.01)

(52) U.S. Cl.
CPC ............... *A47D 13/043* (2013.01); *B62K 9/00* (2013.01); *B60N 2/309* (2013.01)

(58) Field of Classification Search
USPC .............. 280/87.01, 87.021, 87.051, 33.993, 280/647, 648, 650, 47.34
See application file for complete search history.

(56) References Cited

U.S. PATENT DOCUMENTS

| 1,128,810 A | * | 2/1915 | Martin | ..................... 280/87.021 |
| 1,838,877 A | * | 12/1931 | Stevens | .......................... 280/7.1 |
| 2,006,420 A | * | 7/1935 | Thompson | ................. 280/87.01 |

(Continued)

*Primary Examiner* — Hau Phan
*Assistant Examiner* — Bryan Evans
(74) *Attorney, Agent, or Firm* — Stites & Harbison PLLC; Cong Ding (57) ABSTRACT

The invention provides a multifunctional baby walker, which comprises a tray frame, a chassis frame, a supporting frame and roller wheels. The chassis frame comprises two side brackets respectively located at two sides of the baby walker and a front bracket for connecting front ends of the two side brackets. A lower portion of the supporting frame substantially is connected to the middle of the front bracket, the supporting frame has an accommodating space and a handle provided at an upper portion thereof. The baby walker also comprises a seat pocket assembly which comprises a front support rod, a seat pocket slidably connected to the front support rod along the extending direction of the front support rod, and rear support rods at two sides of the baby walker with rear ends respectively rotatably connected to rear portions of the side brackets. The rotation axis of the front support rod relative to the front bracket extends horizontally. A front end of each rear support rod is detachably connected to a rear portion of the seat pocket, a front portion of the tray frame is detachably connected to the upper portion of the supporting frame, and a rear portion of the tray frame is detachably connected to the front end of each rear support rod. The baby walker of the invention has three statuses, and the baby walker has a simple configuration and can be conveniently operated.

10 Claims, 11 Drawing Sheets

(56) References Cited

U.S. PATENT DOCUMENTS 5,362,272 A * 11/1994 Chow et al. .................. 446/278
5,441,289 A * 8/1995 Spielberger .............. 280/87.051
2002/0000702 A1* 1/2002 Charron ................... 280/87.021
2006/0261569 A1* 11/2006 Delhotal .................. 280/87.021

* cited by examiner

BABY WALKER

CROSS REFERENCE TO RELATED APPLICATIONS

This application is a §371 National State Application of PCT/CN2012/083252, filed Oct. 20, 2012, which claims priority to CN201220003584.4, filed Jan. 6, 2012.

FIELD OF THE INVENTION

The present invention relates to a baby walker.

DESCRIPTION OF THE RELATED ART

A walker, which is also known as a baby walker, generally is consisted of wheels, a walker frame, a seat and the like, and it mainly servers as a tool instead of walk for babies before they can walk. Currently there are a wide variety of baby walkers, and all of these existing baby walkers work in a same way, that is to say, a baby is fastened in a baby walker, and the baby can easily slide by means of wheels when she/he desire to move. However, if a baby utilizes such a walker for a long time, she/he will miss the opportunity to sport by herself/himself, and it is adverse for the growth of the baby. Furthermore, such a baby walker will be of little use after the baby can walk and it will take up some space, and it is wasted to throw it off.

SUMMARY OF THE INVENTION

A technical problem to be solved by the invention is to provide a multifunctional baby walker to overcome the deficiencies in the prior art.

For the foregoing purpose, the present invention provides a baby walker, which comprises a tray frame located at an upper portion thereof, a chassis frame located at a lower portion thereof, a supporting frame connected between the tray frame and the chassis frame, and multiple roller wheels disposed at bottom of the chassis frame, and wherein the chassis frame comprises two side brackets respectively located at two sides of the baby walker and a front bracket for connecting front ends of the two side brackets, a lower portion of the supporting frame substantially is connected to the middle of the front bracket, and the supporting frame has an accommodating space having a backward opening and a handle provided at an upper portion thereof for holding. The baby walker also comprises a seat pocket assembly, the seat pocket comprises a front support rod with a lower end being rotatably connected to the front bracket, a seat pocket slidably connected to the front support rod along the extending direction of the front support rod, and at least two rear support rods at two sides of the baby walker with rear ends respectively rotatably connected to rear portions of the side brackets, and wherein the rotation axis of the front support rod relative to the front bracket extends horizontally, and the front support rod and the seat pocket are enabled to be accommodated within the accommodating space. A front end of each rear support rod is detachably connected to a rear portion of the seat pocket, and a front portion of the tray frame is detachably connected to the upper portion of the supporting frame, a rear portion of the tray frame is also detachably connected to the front end of each rear support rod.

In a preferred embodiment, the side brackets at two sides of the baby walker are symmetrical to each other.

Preferably, a rear end of each rear support rod is connected to a side bracket by a connecting sleeve. The connecting sleeve is rotatably connected to the side bracket by a first rotation shaft extending horizontally, and the rear end of each rear support rod is rotatably connected to the connecting sleeve by a second rotation shaft which is perpendicular to first rotation shaft.

More preferably, a housing space is provided at an inner side of each side bracket for receiving a rear support rod.

In a specific embodiment according to the invention, at least two slots respectively are provided at two sides of the rear portion of the seat pocket, and the front end of each rear support rod is inserted into one of the slots.

More preferably, the height of the supporting frame is adjustable.

According to one specific aspect, the supporting frame comprises: a lower bracket with a lower portion being fixedly connected to the front bracket, an upper bracket disposed above and slidable relative to the lower bracket along an up-down direction; and a positioning mechanism for fixing the lower bracket relative to the upper bracket. More specifically, a lower end of the upper bracket is inserted into the lower bracket, the positioning mechanism comprises a button disposed on the lower end of the upper bracket and a positioning hole opened on a side wall of the lower bracket, and the upper bracket is fixed relative to the lower bracket when the button is inserted into the positioning hole. Preferably, a plurality of joints are provided at bottom of the tray frame along an anterior-posterior direction for cooperating with the front ends of the rear support rods.

In some specific embodiments, the front portion of the tray frame is connected on the handle.

Preferably, each of the front support rod and the rear support rods substantially is configured as an arc rod.

Due to the above technical solution, as compared with the prior art the invention has the following advantages:

The baby walker of the invention is a multifunctional walker, which has three working statuses: a conventional walker status, wherein a baby sits in the baby walker and her/his feet can touch the ground; a stroller status, wherein a baby can try to stand up and walk with help; and a riding status. Accordingly, the baby walker is adapted to be utilized by babies of different ages, for example, from a few months old babes to a few years old children. Furthermore, the baby walker of the invention has multiple functionalities, and thus can better help a baby learn to walk. Additionally, the baby walker of the invention has a simple configuration and can be conveniently converted during the three statuses.

Wherein 1. a tray frame; 10, 11. joints; 2. a chassis frame; 20. a side bracket; 21. a front bracket; 3. a supporting frame; 3a. accommodating space; 3b. a handle; 30. a lower bracket; 31. an upper bracket; 4. roller wheels; 5. a seat pocket assembly; 50. a front support rod; 51. a seat pocket; 52. rear support rods; 6. a connection sleeve. 6a. a first rotation shaft; 6b. a second rotation shaft; 70. a button; 71. a positioning hole.

DESCRIPTION OF THE PREFERRED EMBODIMENTS

FIGS. 1-11 illustrate a preferred embodiment according to the invention, this embodiment provides a multifunctional baby walker which has three working statuses: a conventional walker status, wherein a baby sits in the baby walker and her/his feet can touch the ground; a stroller status, wherein a baby can try to stand up and walk with help; and a riding status. The configuration of the baby walker of the invention will be further illustrated in more detail with reference to accompanying drawings.

As shown FIGS. 1 to 11, the baby walker comprises a tray frame 1 located at an upper portion of the baby walker, a chassis frame 2 located at a lower portion of the baby walker, a supporting frame 3 connected between the tray frame 1 and the chassis frame 2, multiple roller wheels 4 disposed at bottom of the chassis frame 2, as well as a seat pocket assembly 5. The chassis frame 2 comprises two symmetrical side brackets 20 at two sides of the baby walker and a front bracket 24 for connecting front ends of the two side brackets 20. The lower portion of the supporting frame 3 substantially is fixedly connected to the middle of the front bracket 21.

Figure 1:
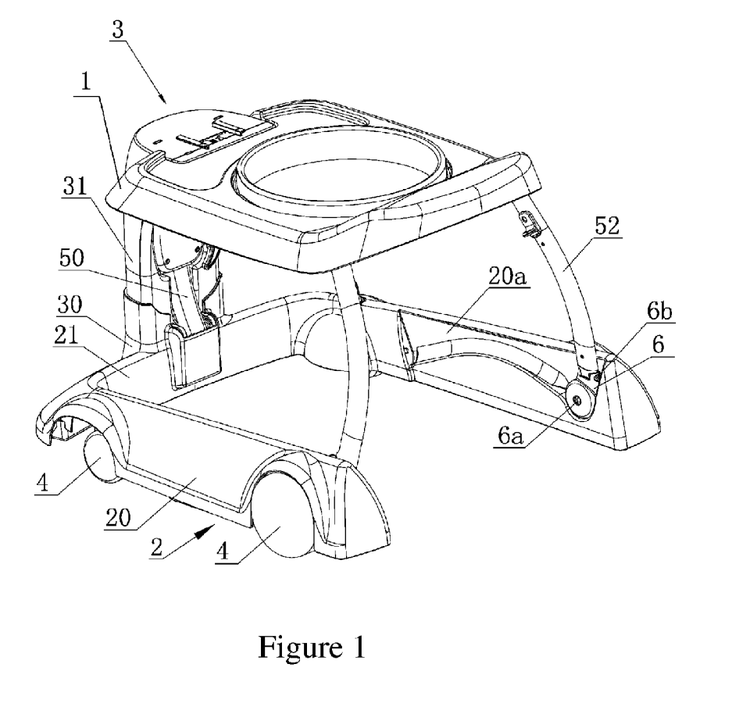
FIG. 1 is a perspective drawing of a baby walker in a walker status according to the invention.
Figure 2:
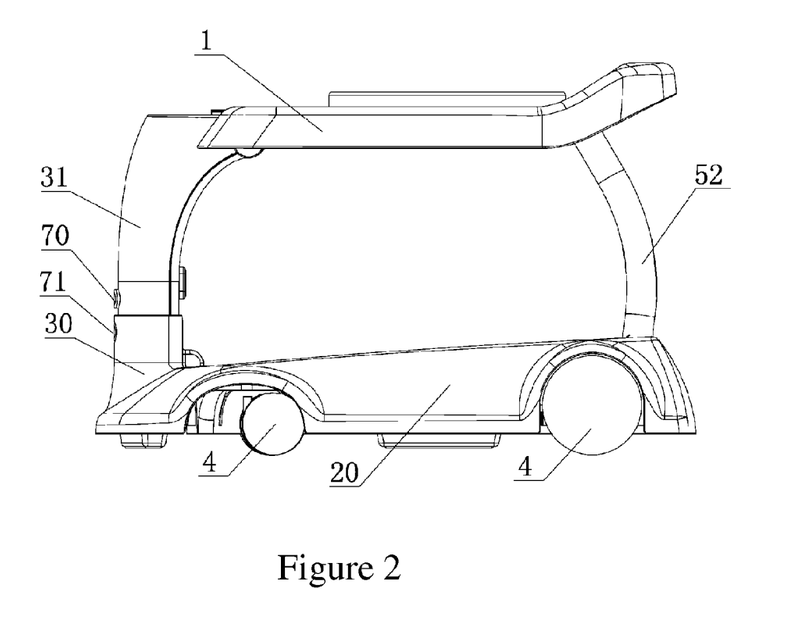
FIG. 2 is a side view of the baby walker in FIG. 1.
Figure 3:
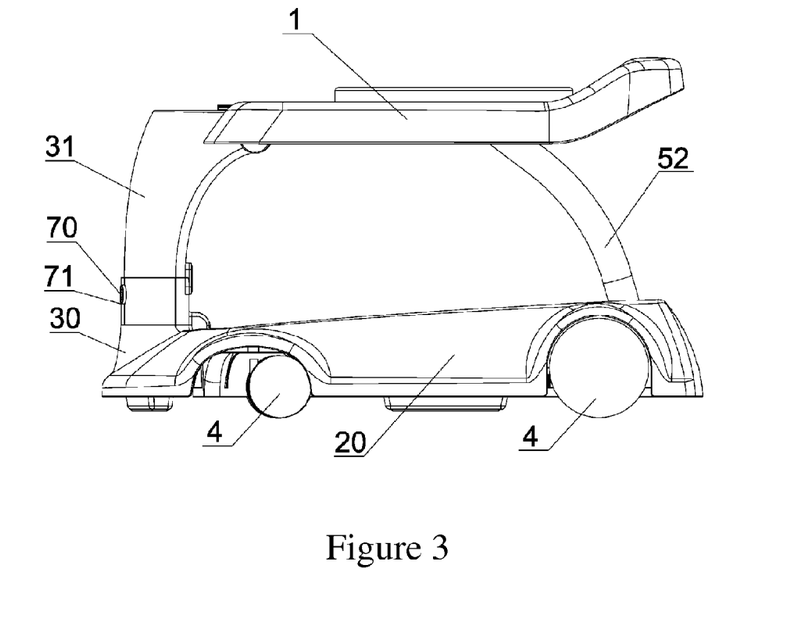
FIG. 3 is a side view of the baby walker in FIG. 1, wherein its height is adjusted.
Figure 4:
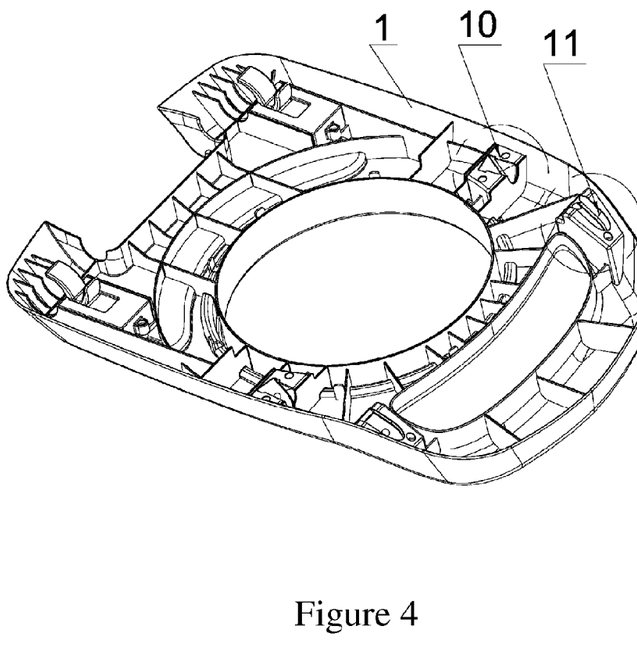
FIG. 4 is a perspective drawing of the tray frame in FIG. 1.
Figure 5:
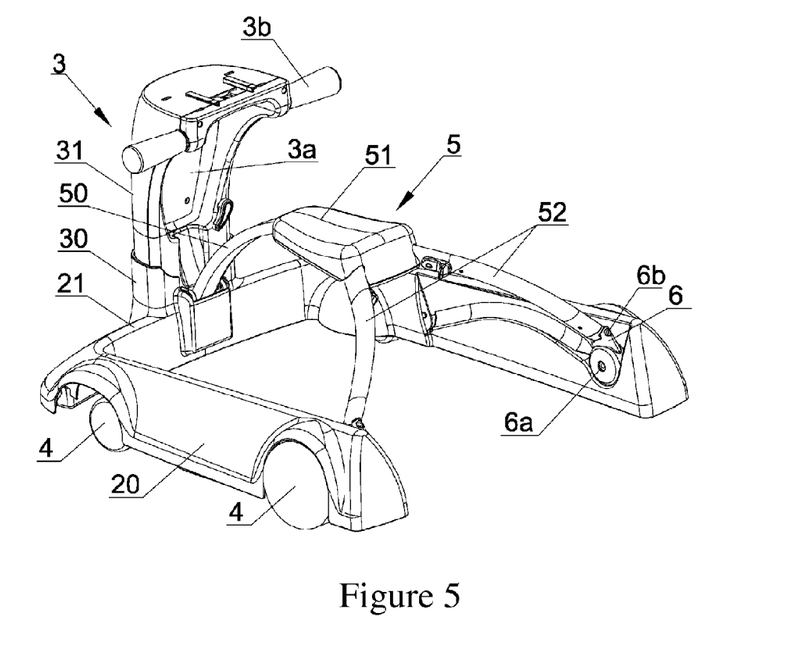
FIG. 5 is a perspective drawing of the baby walker in a riding status according to the invention.
Figure 6:
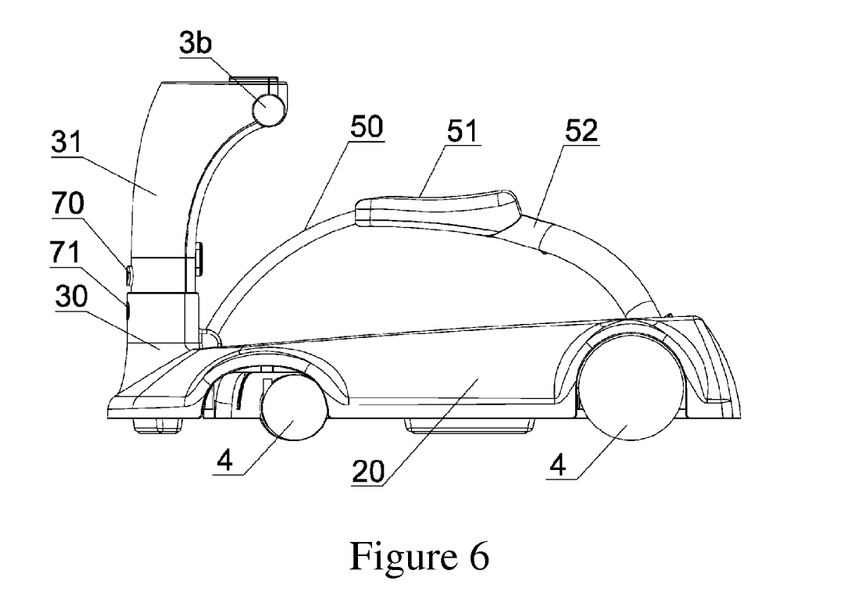
FIG. 6 is a side view of the baby walker in FIG. 5.

The supporting frame 3 further comprises a lower bracket 30 with a lower portion being fixedly connected to the front bracket 21, an upper bracket 31 with a lower end being inserted into the lower bracket 30, and between the lower bracket 30 and the upper bracket 31 a positioning mechanism is disposed for fixing them to each other. In this embodiment, the positioning mechanism comprises a button 70 disposed on the lower end of the upper bracket 31 and a positioning hole 71 opened on a side wall of the lower bracket 30, the upper bracket 31 is fixed relative to the lower bracket 30 when the button 70 is inserted into the positioning hole 71, in this case the supporting frame 3 is in a first height, as shown in FIG. 3. When it is desired to increase the height of the supporting frame 30, the button 70 is pressed and detached from the positioning hole 71, and then the upper bracket 31 is pulled up to reach a second height, as shown in FIG. 2. Furthermore, the supporting frame 3 also has an accommodating space 3a having a backwards opening, and is provide with a handle 3b for holding at an upper portion thereof.

Figure 7:
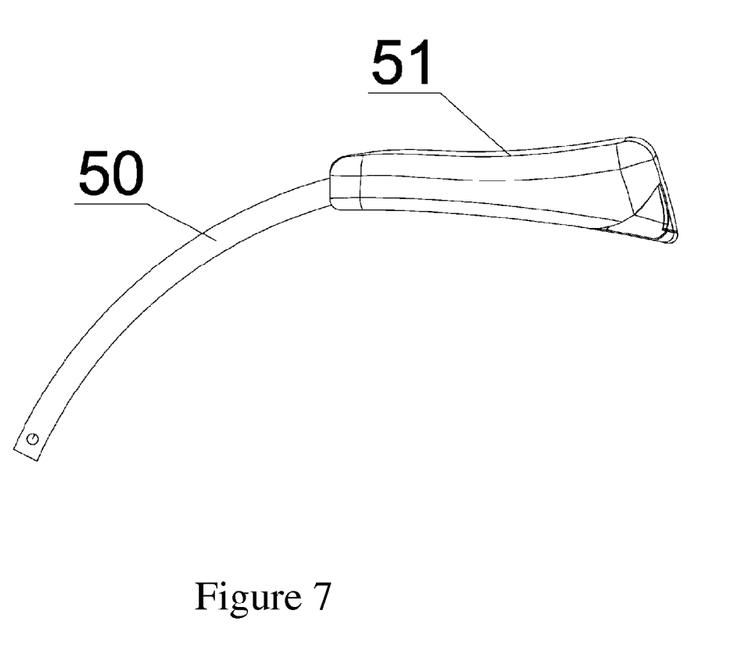
FIG. 7 is a perspective drawing of the front support rod and the seat pocket according to the invention.
Figure 8:
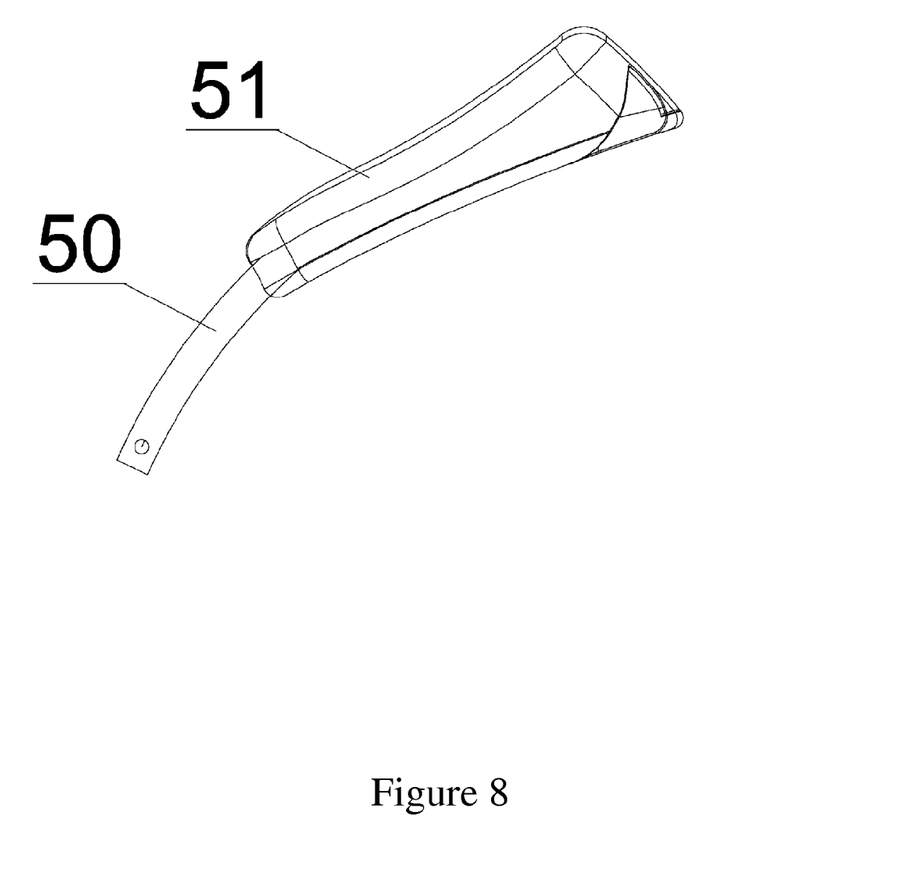
FIG. 8 is another perspective drawing of the front support rod and seat pocket according to the invention.
Figure 9:
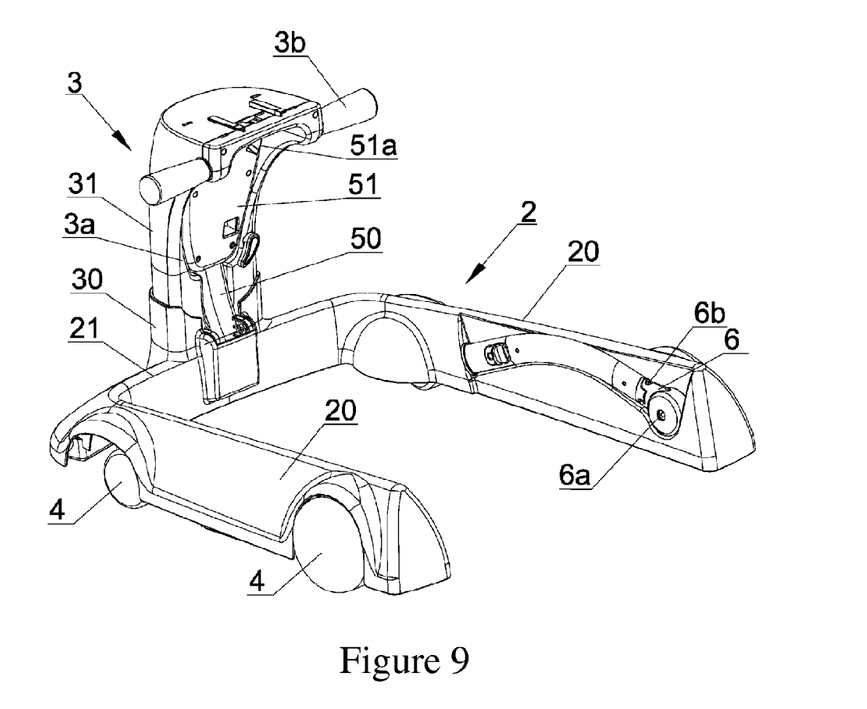
FIG. 9 is a perspective drawing of the baby walker in a stroller status according to the invention.
Figure 10:
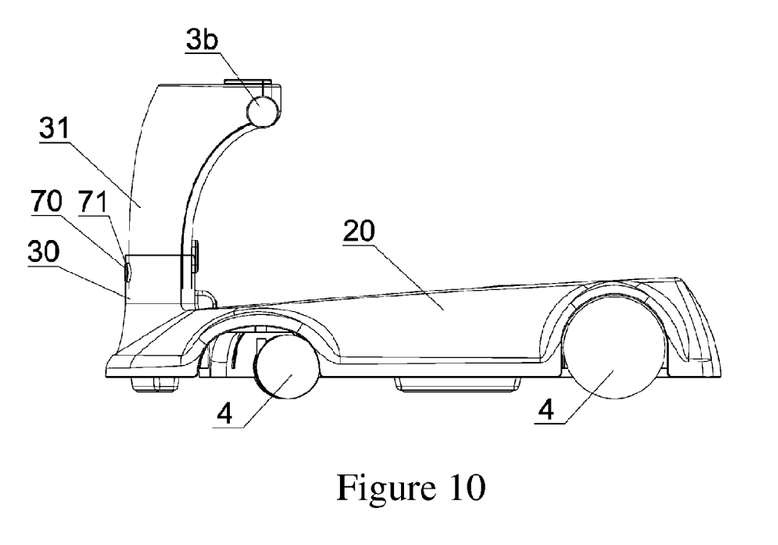
FIG. 10 is a side view of the baby walker in FIG. 9.
Figure 11:
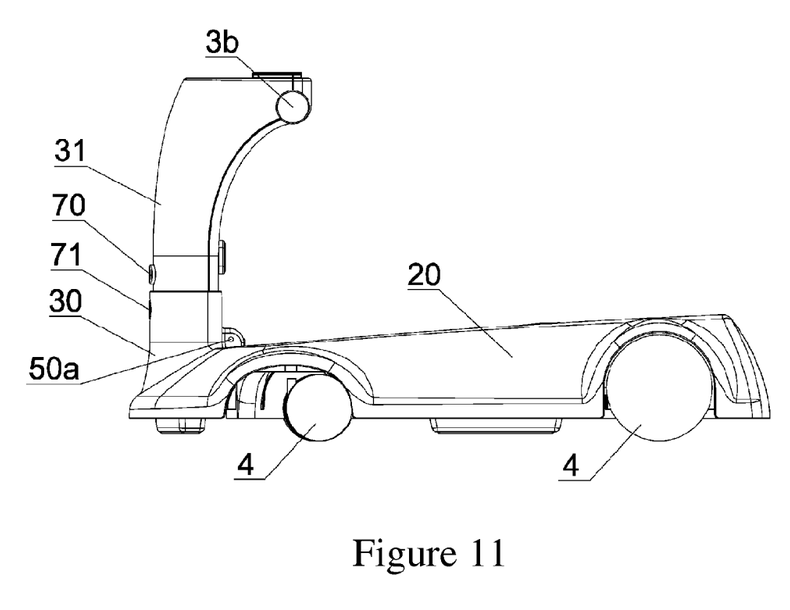
FIG. 11 is a side view of the baby walker in FIG. 9, wherein its height is adjusted.

The seat pocket assembly 5 comprises an arc front support rod 50 with a lower end being rotatably connected to the front bracket 21, a seat pocket 51 and arc rear support rods 52 at two sides of the baby walker. As shown in FIGS. 7 and 8, the seat pocket 51 can slide along the extending direction of the front support rod 50, this design is advantageous, particularly when the seat pocket 51 and the front support rod 50 are not in use, firstly the seat pocket 51 slides along the front support rod 50 so that the whole volume of them is smaller, and then the seat pocket 51 and the front support rod 50 are rotated relative to the front bracket 21 such that they are accommodated within the accommodating space 3a of the supporting frame 3. The rear support rods 52 have three statuses: in a first status, the rear support rods 52 support the seat pocket 50 together with the front support rod 51, so that the baby walker is in a riding status, as shown FIG. 5; in a second status, the rear support rods 52 support the tray frame 1 together with the supporting frame 3, so that the baby walker is in a conventional walker status, as shown FIG. 1; and in a third status, the rear support rods 52 are received within the housing space 20a at an inner side of the side brackets 20 so that the baby walker is in a stroller status as shown in FIG. 9. Specifically, the front ends of the rear support rods 52 are detachably connected to the rear portion of the seat pocket 51, and the front ends of the rear support rods 52 are also detachably connected to the tray frame 1, and the rear ends of the rear support rods 52 are connected to the side brackets 20 by connection sleeves 6. Preferably, a connecting sleeve 6 is rotatably connected to the inner side of a side bracket 20 by a first rotation shaft 6a extending horizontally, and a rear end of a rear support rod 52 is rotatably connected to the connecting sleeve 6 by a second rotation shaft 6b which is perpendicular to first rotation shaft 6a, thus, the front ends of the rear support rods 52 can move upwards and towards the middle relative to the side brackets 20, and thus the baby walker can be converted during the three statuses. By means of the above connection means, the rear support rods 52 can be adjusted freely in a wide angle range.

As described above, the height of the supporting frame 3 is adjustable. A plurality of joints 10, 11 are provided at bottom of the tray frame 1 along an anterior-posterior direction so that the tray frame 1 is adapted to connected with the rear support rods 52 in different heights. For example, the front ends of the rear support rods 52 are connected with the tray frame 1 by joints 11 when the baby walker is in a height shown in FIG. 2, and the front ends of the rear support rods 52 are connected with the tray frame 1 by joints 10 when the baby walker is in a height shown in FIG. 3.

In conclusion, the baby walker of this embodiment of the invention has the following advantages:

1. The baby walker of the invention has multiple functions, it can server as a conventional walker, a stroller for pushing or a carriage for riding, thus, it can help a baby learn to walk and can be adapted to children in a wider range of ages. Furthermore, the baby walker is adjustable in height when it is used as a conventional baby walker or a stroller, thus, expected effects can be achieved for the children or babies in different heights.

2. The baby walker is designed ingeniously and simple in configuration, and no any other parts are added comparing the existing single-functional baby walkers.

3. The baby walker can be converted conveniently and optionally during the three statuses.

The invention is illustrated detailedly as above, however it is to be noted, that the aim is intended to enable a person skilled in the art to appreciate the content of the invention and further implement it, and the protecting scope of the invention can not be limited hereby. Also, any equivalent variations or modifications made according to the spirit of the invention should be covered within the protecting scope of the invention.

What is claimed is:

1. A baby walker, comprising:
a tray frame (1) located at an upper portion thereof;
a chassis frame (2) located at a lower portion thereof, which comprises two side brackets (20) respectively located at two sides of the baby walker, each of the two side brackets (20) having a front end, and a front bracket (21) for connecting front ends of the two side brackets (20);
a supporting frame (3) connected between the tray frame (1) and the chassis frame (2), which has an accommodating space (30a) having a backward opening and a handle (3b) provided at an upper portion thereof for holding, a lower portion of the supporting frame (3) substantially being connected to the middle of the front bracket (21), and the upper portion of the supporting frame (3) being detachably connected to a front portion of the tray frame (1);

a seat pocket assembly (5), comprising a front support rod (50) with a lower end being rotatably connected to the front bracket (21), a seat pocket (51) slidably connected to the front support rod (50) along the extending direction of the front support rod (50), and at least two rear support rods (52) at two sides of the baby walker with rear ends respectively rotatably connected to rear portions of the side brackets (20), wherein a front end of each rear support rod (52) being detachably connected to a rear portion of the seat pocket (51), the front end of each rear support rod (52) being detachably connected to a rear portion of the tray frame (1), and the front support rod (50) and the seat pocket (51) being enabled to be accommodated within the accommodating space (30a); and a plurality of roller wheels disposed at bottom of the chassis frame (2);

wherein the front support rod (50) can rotates relative to the front bracket (21) about a rotation axis which extends horizontally.

2. The baby walker as claimed in claim 1, wherein a rear end of each rear support rod (52) is connected to a side bracket (20) by a connecting sleeve (6) which is rotatably connected to the side bracket (20) by a first rotation shaft (6a) extending horizontally, the rear end of each rear support rod (52) being rotatably connected to the connecting sleeve (6) by a second rotation shaft (6b) which is perpendicular to first rotation shaft (6a).

3. The baby walker as claimed in claim 1, wherein at an inner side of each side bracket (20) a housing space (20a) is provided for receiving a rear support rod (52).

4. The baby walker as claimed in claim 1, wherein at least two slots (51a) respectively are provided at two sides of the rear portion of the seat pocket (51), and the front end of each rear support rod (52) inserting into one of the slots (51a).

5. The baby walker as claimed in claim 1, wherein the supporting frame (3) comprises:

a lower bracket (30) with a lower portion being fixedly connected to the front bracket (21);

an upper bracket (31) disposed above the lower bracket (30), which is slidable relative to the lower bracket (30) along an up-down direction; and a positioning mechanism for fixing the lower bracket (30) relative to the upper bracket (31).

6. The baby walker as claimed in claim 5, wherein a lower end of the upper bracket (31) is inserted into the lower bracket (30), the positioning mechanism comprising a button (70) disposed on the lower end of the upper bracket (31) and a positioning hole (71) opened on a side wall of the lower bracket (30), the upper bracket (31) is fixed relative to the lower bracket (30) when the button (70) is inserted into the positioning hole (71).

7. The baby walker as claimed in claim 5, wherein a plurality of joints (10, 11) are provided at bottom of the tray frame (1) along an anterior-posterior direction for cooperating with the front ends of the rear support rods (52).

8. The baby walker as claimed in claim 1, wherein the front portion of the tray frame (1) is connected on the handle (3b).

9. The baby walker as claimed in claim 1, wherein each of the front support rod (50) and the rear support rods (52) substantially is configured as an arc rod.

10. The baby walker as claimed in claim 1, wherein the side brackets (20) at two sides of the baby walker are symmetrical to each other.

* * * * *